United States Patent [19]

Glemet

[11] Patent Number: 5,187,018
[45] Date of Patent: Feb. 16, 1993

[54] FIBER-REINFORCED THERMOPLASTIC POLYMER COMPOSITE AND PROCESS FOR PREPARATION THEREOF

[75] Inventor: Michel Glemet, Serquigny, France

[73] Assignee: Atochem, France

[21] Appl. No.: 717,372

[22] Filed: Jun. 19, 1991

Related U.S. Application Data

[62] Division of Ser. No. 841,194, Mar. 19, 1986, Pat. No. 5,047,263.

[30] Foreign Application Priority Data

Mar. 24, 1985 [FR] France ............................... 85 04374

[51] Int. Cl.$^5$ .......................... B32B 5/22; B32B 27/34
[52] U.S. Cl. .................................. 428/474.7; 428/290; 428/383; 428/273; 428/286
[58] Field of Search ............ 428/290, 302, 383, 474.7

[56] References Cited

U.S. PATENT DOCUMENTS

| | | | |
|---|---|---|---|
| 3,863,758 | 2/1975 | Connelly | 428/194 |
| 4,277,531 | 7/1981 | Picone | 428/234 |
| 5,045,367 | 9/1991 | Bobsein | 428/290 |
| 5,122,420 | 6/1992 | Baron et al. | 428/474.4 |

FOREIGN PATENT DOCUMENTS

| | | |
|---|---|---|
| 1094439 | 12/1965 | United Kingdom . |
| 1056103 | 1/1967 | United Kingdom . |
| 1227756 | 4/1971 | United Kingdom . |

*Primary Examiner*—George F. Lesmes
*Assistant Examiner*—Kathryne E. Shelborne

[57] ABSTRACT

A fiber-reinforced thermoplastic composite comprising a fiber reinforcement, a first thermoplastic polymer about said fiber reinforcement, and a second thermoplastic polymer interposed between said fiber reinforcement and said first thermoplastic polymer; said second thermoplastic polymer being different from and compatible with said first thermoplastic polyer and capable of wetting said fiber reinforcement; and to the process of making such composite.

4 Claims, No Drawings

FIBER-REINFORCED THERMOPLASTIC POLYMER COMPOSITE AND PROCESS FOR PREPARATION THEREOF

This application is a division, of application Ser. No. 06/841,194, filed Mar. 19, 1986, now U.S. Pat. No. 5,047,263.

BACKGROUND OF THE INVENTION

The present invention pertains to a fiber-reinforced thermoplastic composite material in which the intimate bond between the polymer and the fibers is ensured by a second thermoplastic polymer which is compatible with the first one and facilitates the wetting of the fibers. The said composite material is manufactured by coating the fibers with a second thermoplastic polymer which facilitates wetting, the first thermoplastic coating polymer adhering in the hot state to the said wetting-promoting polymer.

French Patents Nos. 2,414,995 and 2,463,221 teach that composites based on fiber-reinforced thermoplastic polymers can be manufactured, but the thermoplastic coating polymer is always brought directly into contact with the fiber. It was observed that the standard thermoplastics used for this kind of application do not possess sufficient wetting properties to ensure an intimate contact with the fibers. This results in a composite possessing a relatively heterogeneous structure, which necessarily leads to a deterioration of the mechanical properties of the end product. Without seeking to reduce this heterogeneity, it is proposed in French Patent No. 1,578,394 that the organic fibers used as the filler be coated by soaking them in a solution of the said polymer, after which the solvent is removed and the dried fiber system is granulated to protect the said organic fibers. This granulated material is then associated with the same, filler-free polymer to manufacture the composite. This complicated method, which destroys the fibers, does not improve the intimate contact between the said fibers and the polymer at all in comparison with the techniques described in the two preceding patents.

To protect the fibers and to avoid their destruction during grinding, it is also proposed in U.S. Pat. No. 3,863,758 that a sandwich be prepared in advance; which is formed by polymer powder-coated fibers, after which the whole system is then wrapped into films from the same polymer. This sandwich is then molded to form a composite. Since the same standard polymer is used to coat the fibers, the same problems arise again as in the case of Pat. Nos. 2,414,995 and 2,463,221.

SUMMARY OF THE INVENTION

The method of making composites and the resultant composites according to the present invention possess improved mechanical properties due to the interposition of a second thermoplastic polymer which facilitates wetting between the standard thermoplastic polymer and the fibers.

Briefly, the present invention comprises a fiber-reinforced thermoplastic composite comprising a fiber reinforcement, a first thermoplastic polymer about said fiber reinforcement, and a second thermoplastic polymer interposed between said fiber reinforcement and said first thermoplastic polymer; said second thermoplastic polymer being different from and compatible with said first thermoplastic polymer and capable of wetting said fiber reinforcement, and to the process of making such composite as hereinafter set forth.

DETAILED DESCRIPTION

The essence of the instant invention is the said second polymer, which is compatible with the first polymer, thoroughly coats the fibers and intimately penetrates into the inside of the mats, and makes it possible to prepare a homogeneous composite because of its compatibility with the standard polymer. While measures were taken in the prior art to protect the fibers during the manufacture of the composite, no attention was ever paid to the contact between the fibers and the polymer. It was always erroneously believed that being embedded in the composite would be sufficient for the fibers to ensure good reinforcing. As regards the contact with the resins, the lubrication of the fibers should be sufficient because the association of two carefully selected polymers was found to markedly improve the properties of the composites.

To ensure the homogeneity of the composite, it is absolutely necessary for the two thermoplastic polymers to be compatible. This compatibility is a characteristic which has never been scientifically defined in a fully satisfactory manner, even though its practical importance is considerable and well known to the person skilled in the art. Without entering into the highly controversial details related to the partial reciprocal miscibility of the polymers in question, for the purposes of the instant invention, two polymers are compatible if it is possible to mix them so as to obtain a material possessing a mechanical strength that is close or superior to the strength of the weakest of these polymers. According to this definition, examples of compatible pairs of polymers suitable in the present invention include:

- high-density grafted polyethylene—low-density polyethylene,
- high-density grafted polyethylene—ethylene-vinyl acetate (EVA) copolymer,
- grafted EVA—polyvinyl chloride,
- grafted polypropylene—polypropylene,
- sequenced poly(ether amide) copolymer—polyamide,
- polyamide carrying functional groups (e.g., $\alpha, \omega$ diamines, $\alpha, \omega$ diacids, $\alpha$-amine, $\omega$-acid, monoamine)—polyamide,
- modified EVA—EVA or low-density polyethylene (LD-PE), and
- linear grafted low-density polyethylene (L-LD-PE)—L-LD-PE or LD-PE.

In contrast, a vinyl chloride homopolymer and a styrene homopolymer are incompatible.

It is also necessary to have a second thermoplastic polymer possessing a strong ability to wet the reinforcing fibers, which permits a good interfacial bond at the interface between the first polymer and the fibers of the composite. The wetting-promoting thermoplastic polymer is defined as a polymer which permits intimate surface contact between the fiber and the polymer to be increased, thus playing the role of a coupling agent. The roles played by the coupling agents are explained in *Polymer Engineering Composite*, M. O. W. Richardson, Appl. Sc. Publ., 1977. The best known of the coupling agents are the organosilanes. Some of the thermoplastic polymers which facilitate wetting are also known to possess adhesive properties. The adhesive properties of the thermoplastic materials used in the present invention are irrelevant. In fact, it is known that in order for a coating to adhere to a surface; e.g., a metallic surface, it is necessary to use a bonding agent. This has never been considered in the fiber-reinforced thermoplastic composite manufacturing technology. In this type of material, the fibers which are in an intimate contact with the resins have always been thought not to need any adhesion properties other than those conferred to them by the conventional wrapping methods. These techniques only modify the surface finish of the fibers without acting on the coating polymer. According to the technique of the present invention, no advantage could be expected from the interposition of a third carefully selected polymer between the fibers and the coating polymer.

The wetting-promoting thermoplastic polymer is usually selected from among the low-viscosity polymers and the polymers whose polarity is increased in comparison with that of the corresponding original polymers are excluded only if the same polymer can possess these two characteristics.

The low-viscosity polymer is preferably a polymer whose melt viscosity (Of +40° C.) is at most equal to that of a polypropylene with a melt index of 20 at 230° C. under a pressure of 2.16 kg according to the standard ASTM D 1238.

The following low-viscosity polymers can be mentioned as examples: the polymers modified by degradation with peroxide, as in the case of, e.g., polypropylene, polyamide, polystyrene, or the polymers resulting from the polyaddition of a polyamide oligomer carrying functional groups with a reaction partner such as, e.g., a polyepoxy or a polyisocyanate or a polypropylene oligomer carrying functional groups with a reaction partner such as, e.g., a polyether diol, dihydroxylated polybutadiene or an $\alpha, \omega$ diamine polyamide.

The polymers with possibly reactive polar sites are preferred among the polymers whose polarity is increased compared with that of the corresponding original polymers. The polymers with polar sites are generally polymers modified either by grafting or by sequencing based on, e.g., maleic anhydride, acrylic acid, and vinyl acetate in the case of polyethylene, polypropylene or the copolymers, or more generally, on the basis of compounds providing, e.g., ketone, aldehyde, acid, ester, cyano, amine, etc. type polar sites.

The following materials can be mentioned as particularly recommended polymers modified by grafting or sequencing: grafted polypropylene such as polypropylene grafted with maleic anhydride or acrylic acid, poly(ethylene-vinyl acetate), high-density grafted polyethylene such as high-density polyethylene grafted with acrylic acid or maleic anhydride, low-density linear grafted polyethylene such as low-density linear polyethylene grafted with acrylic acid or maleic anhydride and the sequential poly(ether amide) copolymers.

The process for manufacturing a fiber-reinforced thermoplastic polymer composite according to the present invention comprises the interposition of a second thermoplastic polymer between the fibers and the first thermoplastic polymer, characterized in that the said second polymer is compatible with the first one and facilitates the wetting of the fibers and heat-curing the whole system.

A preferred process consists of the impregnation of the fibers in the form of filaments, fabrics, mats or other forms with the wetting-promoting polymer. This impregnation may be carried out according to any known method.

Even though it is possible to impregnate the fibers according to the wet method by treating them with a polymer dispersion or a polymer solution followed by drying of the fibers to eliminate the dispersing liquid of the solvent, the impregnation is preferably carried out according to the dry method, using the wetting-promoting thermoplastic polymer in the form of a powder. It is possible in this case to employ the technique which consists of powdering the fibers by means of, e.g., an oscillating screen, using the polymer in the form of a powder in which the mean particle diameter is smaller than 400 microns. It is also possible to impregnate the fibers by passing them through a fluidized bed, the mean polymer particle diameter preferably being smaller than 125 microns in this case.

The fibers impregnated with powder are then hot-coated with the standard thermoplastic polymer. This coating may be carried out according to the known techniques, e.g., by bringing into contact the polymer in the form of a film, panel or the like with the fibers impregnated with the powder and subsequent heat treatment of the whole system under pressure, or by cross-head extrusion, causing the fibers impregnated with the powder to pass through a square die fed with standard thermoplastic polymer by an extruder.

According to another process, the fibers are hot-coated with the wetting-promoting polymer in the form of a film or panel, which was prepared in advance, after which this polymer layer is covered with standard polymer. The operation can be carried out simply by depositing a film or panel of the two polymers according to the present invention on the fibers, which said film or panel was prepared, e.g., by coextrusion, the surface formed by the wetting-promoting polymer being, of course, in contact with the fibers, after which the whole system is pressed together in the hot state under pressure.

In a more simple manner, a fiber or network may be coated directly by coextrusion of two thermoplastic resins in a square die, the thermoplastic polymer which promotes wetting forming the internal layer of the sheath being in contact with the fiber.

The fibers used principally according to the present invention are mineral fibers such as silica fibers, and especially glass fibers, without exclusion of synthetic or artificial fibers.

The composite materials according to the present invention can be used as such in the form of sheets or panels. They may also be shaped according to the conventional methods available for the transformation of thermoplastic polymers, e.g., calendering, stamping, hot-forming, filament rolling or molding or stamping after reduction to adequate small pieces.

The present invention will be further described in connection with the following examples which are set forth for purposes of illustration only.

EXAMPLE 1

A long glass-fiber mat (Owens Corning Fiberglas 8610, 900 g/m$^2$) is deposited on the maleic anhydride-containing surface of a film prepared by coextrusion of standard polypropylene (Lacqtene P 3030 FN 1 ATOCHEM) and polypropylene grafted with maleic anhydride (Orevac polypropylene FT, ATOCHEM), the respective polymer thicknesses being 1.3 and 0.2 mm. A three-layered, coextruded film is deposited on the free face of the mat; the core of the latter film consists of standard polypropylene with a thickness of 0.3 mm, and the external surfaces are formed by maleic anhydride-grafted polypropylene with a thickness of 0.1 mm. The above operations are repeated so as to obtain a material which contains three mat layers and is finally covered with standard polypropylene. The whole system is heated to 200° C. for three minutes between the plates of a press and is then compressed at the same temperature for one minute under a pressure of 25 bar. The whole system is then cooled to 80° C. under pressure. A composite with a thickness of 3.6 mm is obtained.

For comparison, a composite of identical structure is prepared under the same conditions based solely on glass-fiber mat and standard polypropylene, the polypropylene layer thickness being adjusted to take into account the absence of maleic anhydride-grafted polypropylene and the fact that the final thickness of the composite shall also be 3.6 mm.

The results of the mechanical tests carried out with these products are presented in the following table:

|  |  | Comparative Experiment |
| --- | --- | --- |
| Glass fiber content, wt. % | 45 | 45 |
| TENSILE STRENGTH |  |  |
| Breaking strength, MPa | 123 | 75 |
| Modulus of elasticity, MPa | 6949 | 6395 |
| BENDING STRENGTH |  |  |
| Maximum stress, MPa | 174 | 103 |
| Modulus of elasticity, MPa | 6589 | 4973 |
| INTERLAMINAR SHEAR |  |  |
| Strength, MPa | 17 | 9 |

EXAMPLE 2

A mixture of an α,ω-diamine polyamide 11 oligomer with a molecular weight of Mn=1535 and a reaction partner of the bisphenol A diglycyl ether (Epikote 1001 SHELL) type is prepared with the following weight ratios in a Brabender extruder equipped with two screws with a diameter of 42.4 mm:

| polyamide oligomer | 61% |
| --- | --- |
| reaction partner | 39% |

The compound obtained is then ground into a fine powder with a particle size of 100 microns and then heated under vacuum.

The fine powder thus obtained is sprinkled on a long glass-fiber mat (Owens Corning Fiberglas 8610, 900 g/m$^2$). The glass-fiber mat impregnated with the powder is then placed between two preextruded polyamide 11 sheets (Rilsan BMN black TLD, ATOCHEM) with a thickness of 0.5 mm.

Up to three glass-fiber mats are placed one on top of another in the above-described manner. The whole system is preheated to 220° C. within three minutes between the plates of a press and then compressed at the same temperature under a pressure of 25 bar within ten minutes. The whole system is then cooled to 80° C. under pressure. A composite with a thickness of 3.5 mm is obtained.

For comparison, a composite with identical structure is prepared under the same conditions, based solely on a glass-fiber mat and a polyamide 11 sheet (Rilsan-BMN black TLD), the PA 11 layer thickness being such that the absence of the reactive powder systems is taken into account and the final thickness of the composite shall be practically 3.5 mm.

The results of the mechanical tests carried out with these products are presented in the following table:

|  |  | Comparative Experiment |
| --- | --- | --- |
| Glass fiber content, wt. % | 45 | 45 |
| TENSILE STRENGTH |  |  |
| Breaking resistance, MPa | 145 | 119 |
| BENDING STRENGTH |  |  |
| Maximum stress, MPa | 208 | 173 |
| Modulus of elasticity, MPa | 8209 | 6539 |

EXAMPLE 3

A fine polypropylene powder with a particle size of 100 microns is desposited by sprinkling on a long glass-fiber mat of the type of Owens Corning Fiberglas 8610, 900 g/m$^2$. This polypropylene is selected among the grades with high-melt indices, the actual polypropylene used in this case having a melt index of 40 measured at 230° C. under 2.16 kg according to the standard ASTM D 1238 (Lacqtene P 3400 MA 1-ATOCHEM).

This mat, impregnated with powder, is then placed between two preextruded sheets of standard polypropylene (Lacqtene P 3030 FN1-ATOCHEM) with a melt index of 3 as measured under the same conditions as above, the thickness of the said sheets being 1 mm.

The above operation is repeated so as to obtain a pile of three layers of powder-impregnated mats and four standard polypropylene sheets with a thickness of 1 mm each.

The whole system is preheated to 200° C. within three minutes between the plates of a press and then compressed at the same temperature under a pressure of 25 bar within one minute. The whole system is then cooled to 80° C. under pressure. A composite with a thickness of 3.3 mm is obtained.

For comparison, a composite with identical structure is prepared under the same conditions, based solely on glass-fiber mat and standard polypropylene, the polypropylene layer thickness being adjusted so as to obtain a composite with the same thickness and the same glass-fiber content.

The results of the mechanical tests carried out with these products are shown in the following table:

|  |  | Comparative Experiment |
| --- | --- | --- |
| Glass fiber content, wt. % | 45 | 45 |
| TENSILE STRENGTH |  |  |
| Breaking resistance, MPa | 93 | 87 |
| BENDING STRENGTH |  |  |
| Maximum stress, MPa | 140 | 100 |
| Modulus of elasticity, MPa | 6407 | 5146 |

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A fiber-reinforced thermoplastic composite comprising a fiber reinforcement, a polyamide about said fiber reinforcement, and a thermoplastic polymer interposed between said fiber reinforcement and said polyamide; said thermoplastic resulting from the polyaddition of a polyamide oligomer carrying functional groups with a reaction partner or a thermoplastic polymer that is a sequenced poly(ether-amide) copolymer and capable of wetting said fiber reinforcement.

2. The composite of claim 1 wherein said fiber is a mineral fiber.

3. The composite of claim 1 or 2 wherein said thermoplastic polymer is a polymer resulting from the polyaddition of a polyamide oligomer carrying functional groups with a reaction partner.

4. The composite of claim 1 or 2 wherein said thermoplastic polymer is a sequenced poly(ether-amide) copolymer.

* * * * *